United States Patent [19]

Nilssen

[11] Patent Number: 4,593,167
[45] Date of Patent: Jun. 3, 1986

[54] ELECTRONIC MICROWAVE OVEN POWER SUPPLY

[76] Inventor: Ole K. Nilssen, Caesar Dr., Barrington, Ill. 60010

[21] Appl. No.: 404,301

[22] Filed: Aug. 2, 1982

[51] Int. Cl.[4] ............................................. H05B 6/64
[52] U.S. Cl. ................. 219/10.55 B; 331/88; 363/23; 363/37; 363/75
[58] Field of Search ............... 219/10.55 B, 10.77; 363/22, 23, 37, 75; 331/86, 87, 88; 315/105; 307/239, 250; 328/66, 67

[56] References Cited

U.S. PATENT DOCUMENTS

| | | | |
|---|---|---|---|
| 3,514,566 | 5/1970 | Ironfield | 219/10.55 B |
| 3,961,152 | 6/1976 | Staats | 219/10.55 B |
| 3,973,165 | 8/1976 | Hester | 219/10.55 B |
| 4,002,875 | 1/1977 | Kiuchi et al. | 219/10.55 B |
| 4,236,055 | 11/1980 | Kaminaka | 219/10.55 B |
| 4,270,082 | 5/1981 | Zaveri | 363/75 X |
| 4,279,011 | 7/1981 | Nilssen | 363/133 |
| 4,339,792 | 7/1982 | Yasumura et al. | 363/75 |

OTHER PUBLICATIONS

Electronic Engineering, "200 KHz Power FET Technology in OEM Modular Power Supplies"; (FIG. 3, p. 40); Sep. 1981.

Electronics; "The Supply Specifier Has a Basic Choice"; (p. 114); Jun. 16, 1981.

"A Resonant Converter with PWM Control"; Mamon, M. et al., Interec '81, Third International Telecommunications Energy Conference, London, England (May 1981).

*Primary Examiner*—Clifford C. Shaw
*Assistant Examiner*—M. M. Lateef

[57] ABSTRACT

A power supply for a magnetron is adapted to be powered from a regular power line and comprises an inverter means operable to provide an AC voltage of relatively high frequency. This relatively high-frequency AC voltage is applied to a step-up transformer, which transformer exhibits a relatively high leakage inductance between its input and output windings. A capacitor is connected across this transformer's output winding and effectively resonates with the internal inductance thereof. A rectifier and filter means is connected in parallel circuit with this capacitor, and provides an output of current-limited substantially constant-magnitude DC voltage for application to the magnetron. As a result, the magnetron is efficiently powered with a nearly constant DC voltage, as contrasted with the pulsed DC voltage normally used for powering magnetrons.

38 Claims, 2 Drawing Figures

ELECTRONIC MICROWAVE OVEN POWER SUPPLY

BACKGROUND OF THE INVENTION

1. Field of the Invention

The present invention relates to electronic means for powering the magnetron in microwave ovens, particularly to means of a type that provides the magnetron with a substantially constant current derived from a programmably controllable inverter-type power supply.

2. Description of Prior Art

The magnetron in presently available microwave ovens is typically powered by a 60 Hz pulsed voltage provided by way of a conventional coil-and-core current-regulated transformer and a combination voltage doubler and rectifier means. In fact, it is believed that in all presently available microwave ovens, the magnetron is powered by way of the methods and circuits described in U.S. Pat. No. 3,396,342 issued to Feinberg and assigned to Advance Transformer Co. of Chicago, Ill.

To the best of my knowledge, no inverter-type power supply for microwave oven magnetrons is presently available for purchase or described in published literature.

RATIONALE RELATED TO THE INVENTION

With the power supply presently used in microwave ovens, the magnetron is being supplied with a current-regulated voltage that is being pulsed in the fashion of a rectified sinewave at some relatively low frequency (typically 60 or 120 Hz). As a result of this sinewave-pulsed and therefore highly variable voltage and current, the magnetron does not operate all the time at its most efficient operating point. In a typical case, the overall conversion efficiency for a magnetron operated with the indicated low-frequency sinewave-pulsed current-regulated voltage may be about 55%. If that same magnetron were to be operated at a fixed voltage and a steady continuous current, the conversion efficiency could instead be about 70%—for some 27% improvement in magnetron efficiency, which implies a 33% reduction of magnetron losses at the same level of power output.

Moreover, with a sinewave-pulsed (and thereby gradually varying) supply voltage, the magnetron goes through a range of oscillatory modes, and consequentially generates spurious oscillations that may be significantly detrimental in their effect. For instance, with presently existing microwave ovens, these spurious oscillations are causing serious problems in terms of interfering with the operation of the family TV set. On the other hand, with a constant magnetron voltage, these spurious oscillations would be greatly minimized—as would then also be the TV interference problem.

With the presently used low-frequency power supplies, it is not practicable to provide for a substantially constant magnetron voltage. The required high-voltage filtering means would simply be far too large and costly.

Never-the-less, when perceiving the various direct and indirect benefits associated with providing the magnetron with a substantially constant supply voltage, and by coupling this perception with the recognitions that:

(a) the requisite high-voltage filtering capacitor would not represent a significant size or cost issue if the power supply were to operate at a frequency substantially higher than 60 or 120 Hz (like in the range from 20 to 40 kHz), and (b) is is possible to design an inverter-type power supply that can meet the requirements associated with powering a microwave oven magnetron from a regular household electric power receptacle, it may be understood that—contrary to expectations—there is considerable economic justification for using an inverter-type power supply for powering the magnetron in microwave ovens, even if such a power supply were to represent a significant direct cost-penalty as compared with the conventional low-frequency power supply.

Moreover and unexpectedly, there are some significant additional benefits that may be obtained in connection with using an inverter-type power supply for the magnetron—benefits such as: improved controllability of magnetron power (without the need for using a Triac for switching the line voltage applied to the magnetron power supply ON or OFF); availability of power from the inverter for other loads in the microwave oven even during periods when the inverter is not powering the magnetron; reduced requirements of the blower used for cooling the magnetron (because of the increased efficiency of the magnetron); and/or more cooking power available from a given size magnetron.

Yet, even with the improved magnetron efficiency, to provide the normally required 700 Watt of microwave cooking power will still require about 1000 Watt of current-regulated real power input to the magnetron. With 1000 Watt of real power being provided by an inverter in a current-regulated fashion (as, for instance, with the current being limited by an inductive means), the implication is that the inverter itself will have to handle 4000 to 6000 Volt-Amp; which implies the need for using extremely high-powered and therefore costly transistors for efficiently handling a Volt-Amp product of that kind of magnitude; which further implies that inverters may be more costly than could reasonably be justified by the value advantages they would provide to the microwave oven.

However, the perception that a series-resonant circuit coupled across the voltage output of the inverter can be used for achieving, not only the requisite current-regulated constant voltage for the magnetron, but also a drastic reduction in the magnetude of the Volt-Amp product that need be handled by the transistors, provides for a correspondingly drastic reduction in the requirements of the inverter and hence its cost; which then does appear to permit the cost of the inverter power supply to be reduced to a level that is commensurate with the values derived from it in the context of a microwave oven.

SUMMARY OF THE INVENTION

1. Objects of the Invention

A first object of the present invention is that of providing an inverter-type power supply for the magnetron in a microwave oven.

A second object is that of providing a magnetron power supply that is substantially reduced in weight and volume as compared with presently available power supplies.

A third object is that of providing a magnetron power supply that powers the magnetron with a substantially constant current as compared with the pulsed current of present power supplies.

A fourth object is that of providing a magnetron power supply the output of which is easier to control than is the case with present power supplies.

A fifth object is that of providing a magnetron power supply that is particularly suited for integration with a microwave oven and its controls.

A sixth object is that of providing a magnetron power supply that is more efficient that is the case with presently available power supplies.

A seventh object is that of providing for a microwave oven a combination electronic power supply and a programmable control means.

An eighth object is that of providing a magnetron power supply that permits the magnetron to operate in a mode of substantially higher efficiency.

A ninth object is that of providing a high-frequency inverter power supply for a magnetron wherein high-frequency power is being extracted from the inverter at a relatively high power factor.

These as well as other objects, features and advantages of the present invention will become apparent from the following description and claims.

2. Brief Description

The present invention relates to an electronic power supply for the magnetron in a microwave oven of the type adapted to be powered from a standard household electric power receptacle.

In this electronic power supply, an inverter is used for generating a relatively high frequency AC voltage of moderate voltage magnitude. A transformer connected at the output of this inverter provides isolation from the power line as well as step-up transformation of this relatively high frequency AC voltage, thereby providing the high-magnitude power-line-isolated voltage required for the magnetron. (Because of the relatively high frequency—being 30 kHz or so—this transformer is very small and light compared with the transformer presently used for providing high voltage for the magnetron.)

To optimize magnetron power conversion efficiency, while at the same time minimizing its spurious responses, this high-magnitude voltage is rectified and filtered before being applied across the magnetron; which magnetron is thus being operated at a substantially constant DC voltage. (Because of the relatively high frequency, the size and cost of the filtering means are very modest compared to what they would have had to be at a frequency of 60 Hz.)

To achieve a high degree of magnetron power regulation, while also minimizing the Volt-Amp product required to be supplied by the inverter, the power to the magnetron is provided by way of a series-resonant circuit arrangement. This resonant circuit is used in a so-called Q-multiplier arrangement; which implies that the Q-multiplication factor increases as the load decreases; which, due to the highly non-linear voltage-current characteristics of the magnetron, further implies that, as the magnetron voltage is reduced, the circuit Q-factor (and thereby the Q-multiplication factor) increases; which tends to restore the magnetron voltage and thereby to maintain magnetron power.

In other words, the series-resonant circuit arrangement effectively imparts to this magnetron power supply the characteristic normally associated with a current source.

To provide a high degree of power supply controllability, the inverter is provided with input terminals by which its output characteristics can be significantly varied. In particular, means are provided by which the inversion frequency can be varied over a wide range. Thus, at or near the resonant frequency, with the help of the Q-multiplication factor, the magnetron receives its requisite current-regulated high voltage; while at a substantially lower frequency, well removed from resonance, the effect of the Q-multiplication factor is not present and the voltage supplied to the magnetron falls to such a low level as not to give rise to any significant magnetron current. Yet, the inverter is still in operation and can be used for furnishing voltages that are needed for other uses within the microwave oven, such as for powering the programming circuits.

DESCRIPTION OF THE PREFERRED EMBODIMENT

Figure 1:
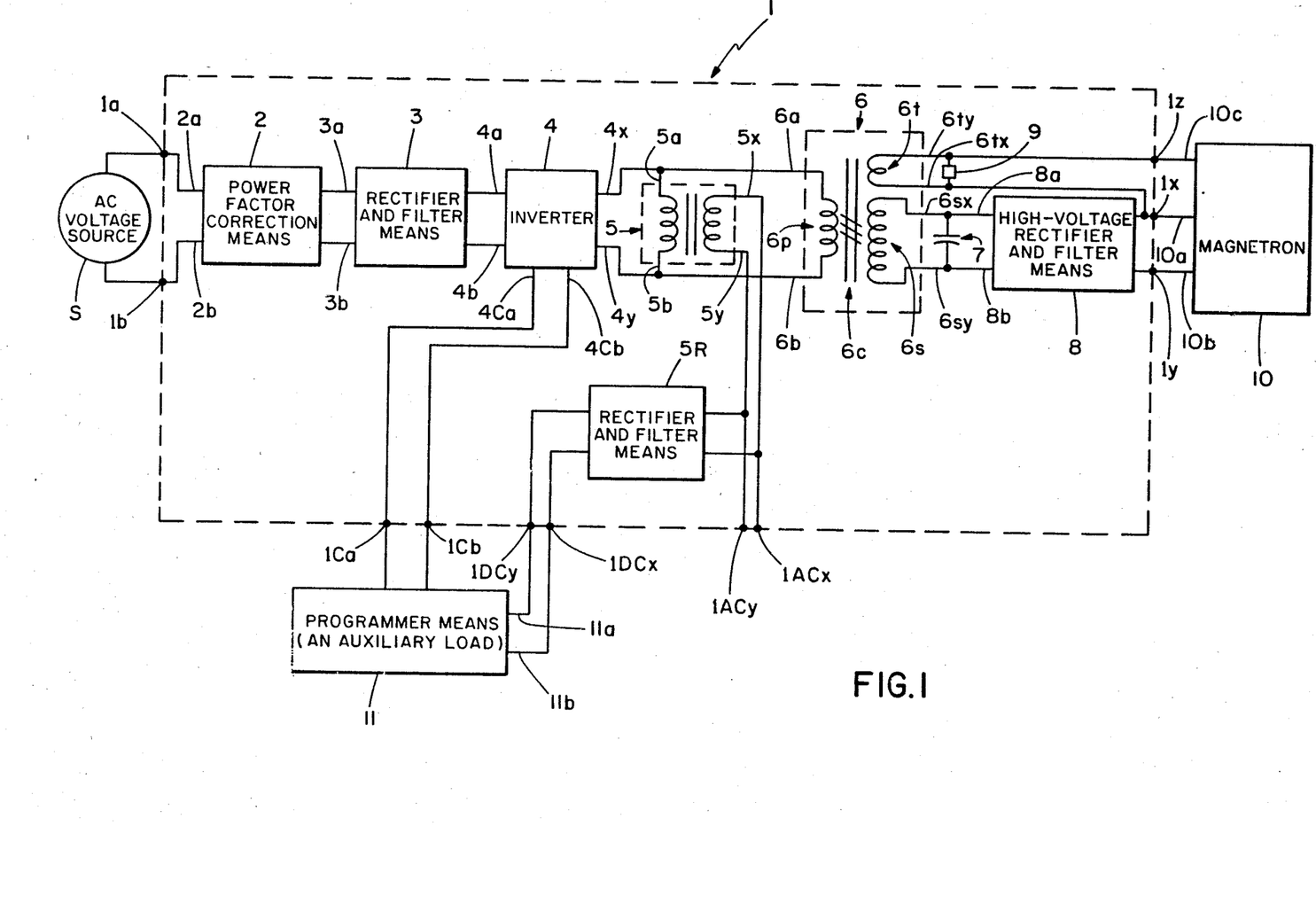
FIG. 1 illustrates the preferred embodiment of the present invention, showing in block-diagrammatic form a controllable electronic power supply for the magnetron in a microwave oven.

FIG. 1 shows a block diagram of the preferred embodiment of an electronic microwave oven power supply constructed in accordance with the present invention.

In FIG. 1, a source of ordinary household AC voltage is represented by S. This AC voltage is provided across a pair of input terminals 1a and 1b to the overall power supply 1. Terminals 1a and 1b are connected with input terminals 2a and 2b of power factor correction means 2, the output of which is provided across input terminals 3a and 3b to rectifier and filter means 3. The output from rectifier and filter means 3 is a substantially constant unidirectional voltage; which voltage is applied across input terminals 4a and 4b of inverter 4.

The output from inverter 4, which is provided across output terminals 4x and 4y, is an AC voltage of a relatively high frequency (such as in the range of 20 kHz to 40 kHz), which AC voltage is provided across input terminals 5a and 5b of auxiliary power transformer 5, and also across input terminals 6a and 6b of main power transformer 6.

Auxiliary power transformer 5 has two output terminals 5x and 5y, which output terminals are electrically isolated from input terminals 5a and 5b. These output terminals 5x and 5y are connected with a pair of auxiliary AC power output terminals 1ACx and 1ACy of overall power supply 1, which terminals are adapted to accept connections with various loads external of the overall power supply.

Output terminals 5x and 5y are also connected to rectifier and filter means 5R, the output from which is connected with a pair of auxiliary DC power output terminals 1DCx and 1DCy of overall power supply 1, which terminals are adapted to accept connections with various loads external of the overall power supply.

Main power transformer 6 has a primary winding 6p, a secondary winding 6s and a tertiary winding 6t, which windings are electrically isolated from each other. Primary winding 6p is magnetically coupled to secondary winding 6s and tertiary winding 6t by way of a magnetic core 6c, which core provides for substantial magnetic flux shunting between said primary winding and said secondary and tertiary windings.

The output from secondary winding 6s is a relatively high voltage, which high voltage is provided across secondary output terminals 6sx and 6sy. The output from tertiary winding 6t, which is provided across tertiary output terminals 6tx and 6ty, is a relatively low voltage that is proportional in magnitude to the voltage output across secondary terminals 6sx and 6sy.

Secondary output terminals 6sx and 6sy are connected across capacitor 7 as well as to input terminals 8a and 8b of high-voltage rectifier and filter means 8. The output from rectifier and filter means 8 is a substantially constant high-magnitude DC voltage, which voltage is provided across output terminals 1x and 1y of overall power supply 1.

Tertiary output terminal 6tx is connected with output terminal 1x and tertiary output terminal 6ty is connected to output terminal 1z of the overall power supply 1. Across tertiary output terminals 6tx and 6ty is connected a voltage limiting means 9.

Output terminals 1x, 1y, and 1z are connected respectively with input terminals 10a, 10b and 10c of magnetron 10, which magnetron is the source of microwave cooking power in a microwave oven. The magnetron's anode is connected with input terminal 10b; its cathode is connected with input terminals 10a and 10c.

Auxiliary output terminals 1DCx and 1DCy of overall power supply 1 are connected to power input terminals 11a and 11b of programmer means 11. An output from this programmer means is connected to control input terminals 1Ca and 1Cb of overall power supply 1, which input terminals are in turn connected to control input terminals 4Ca and 4Cb of inverter 4.

Figure 2:
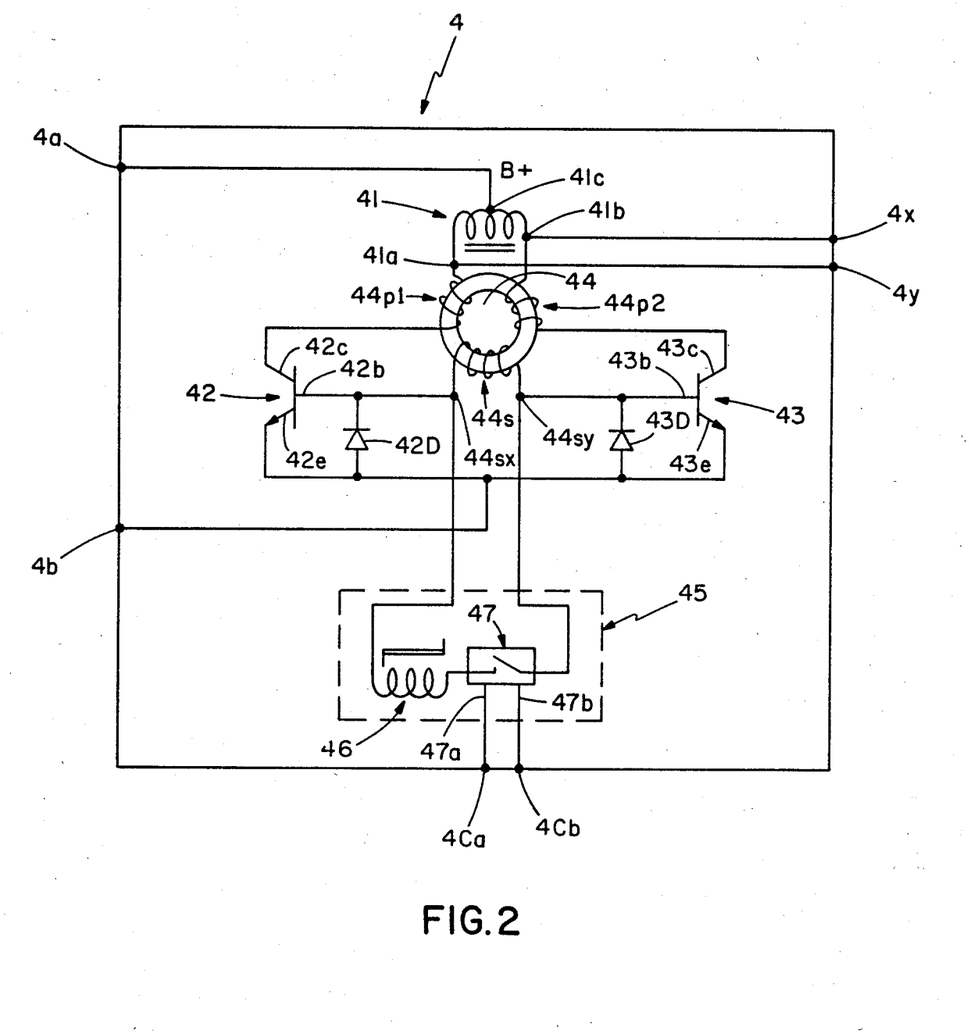
FIG. 2 illustrates an inverter suitable for use in the power supply of FIG. 1 and wherein the inverter frequency is capable of being controlled by application of a control voltage.

Details of inverter 4 are illustrated by FIG. 2, which shows an inverter of basically known type, as described in detail in U.S. Pat. No. 4,279,011 issued to Ole K. Nilssen.

In FIG. 2, the numeral 4 refers to the overall inverter; which inverter is powered by a source of substantially constant DC voltage applied across inverter power input terminals 4a and 4b—with 4a being the positive or B+ terminal. The B+ voltage is applied to the center-tap 41c of the single winding on auto-transformer 41. In addition to the center-tap, this single winding has two connection points 41a and 41b.

The inverter has two transistors 42 and 43 with collectors 42c and 43c, bases 42b and 43b, and emitters 42e and 43e, respectively. Emitters 42e and 43e are connected together and thence to inverter input terminal 4b, which is the negative side of the DC input voltage. Diodes 42D and 43D are connected between the bases and emitters of transistors 42 and 43 respectively.

The inverter has a saturable feedback transformer 44 with a first primary winding 44p1 and a second primary winding 44p2; Transformer 44 also has a secondary winding 44s with output terminals 44sx and 44sy.

Auto-transformer connection points 41a and 41b are respectively connected by way of primary windings 44p1 and 44p2 to collectors 42c and 43c. These connection points are also connected with overall inverter output terminals 4x and 47.

Across the secondary winding of saturable feedback transformer 44 is connected an inverter frequency control means 45, which consists of a series-combination of a saturable inductance means 46 and an electrically actuatable switch means 47. Switch means 47 has two actuating electrical input terminals 47a and 47b.

The overall inverter 4 has two control input terminals 4Ca and 4Cb which are connected with input terminals 47a and 47b of switch means 47.

The operation of inverter 4 is described in said U.S. Pat. No. 4,279,011 except for the action imparted by frequency control means 45. The function of control means 45 is that of providing an electrically actuatable means by which the saturable inductor 46 can be connected in parallel with the secondary winding 44s of the saturable feedback transformer 44. However, for saturable inductor 46 to have an effect on the inverter oscillation frequency, it is necessary that the Volt-second product required by inductor 46 to reach saturation be smaller than the Volt-second product required by secondary winding 44s of feedback transformer 44 to reach saturation. But, as long as such is indeed the case, the inverter oscillation frequency will increase when saturable inductor means 46 is connected in parallel with secondary winding 44s of saturable feedback transformer 44.

Thus, when freqeuncy control means 45 is in the actuated state, the inverter oscillation frequency is higher than it is when control means 45 is in the non-actuated state. The degree to which the frequency is then higher depends on the degree to which saturable inductor 46 requires a smaller Volt-second product for saturation than does secondary winding 44s.

Upon actuation of control means 45, and if a direct short circuit is substituted for saturable inductor 46, instead of increasing in oscillation frequency, the inverter will simply cease oscillating. In this case, however, it is necessary to have another way of powering control means 45 than by way of the inverter auxiliary output, which of course disappears whenever the inverter stops oscillating. A resolution to this problem can be accomplished by using a battery for powering the programming means, and thereby the inverter control means. This battery should preferably be of a rechargeable type—with recharging done by way of the inverter when oscillating.

Having described the non-conventional part of the operation of inverter 4, the operation of the overall power supply circuit of FIG. 1 may now be explained as follows.

Ordinary 120 Volt/60 Hz household power line voltage is applied to the power supply's input terminals 1a and 1b, from where this voltage is applied to rectifier and filter means 3 by way of a power-factor-correction means 2. This power-factor-correction means may consist of a series-connected inductor followed by a shunt-connected capacitor; its main function being that of widening the charging pulses supplied to rectifier and filter means 3.

Rectifier and filter means 3 is constructed in a conventional manner, and provides as an input to inverter 4 a DC voltage of substantially constant magnitude.

In well known manner, inverter 4 converts this input DC voltage into a substantially squarewave AC voltage of a relatively high frequency; which squarewave voltage is used for two purposes: (a) to provide for various auxiliary power outputs, as accomplished by way of transformer 5; and (b) to provide for magnetron power, as accomplished by way of transformer 6.

Irrespective of inverter oscillation frequency, an AC voltage of substantially constant magnitude is provided at the output of auxiliary transformer 5; which voltage in turn is provided across output terminals 1ACx and 1ACy to be used for various auxiliary needs for AC power in a microwave oven—such as for fluorescent lighting inside the oven cooking chamber.

Similarly irrespective of inverter oscillation frequency, a DC voltage of substantially constant magnitude is provided at the output of rectifier and filter means 5R; which voltage in turn is provided across output terminals 1DCx and 1DCy to be used for various auxiliary needs for DC power in a microwave oven— such as for the indicated programming means.

However, in case of transformer 6, because of the relatively loose coupling between the windings, and because the transformer loading is variable with frequency, the AC voltage outputs provided are not of constant magnitude irrespective of inverter oscillation frequency.

In particular, the voltage across secondary winding 6s (that is, the voltage between output terminals 6sx and 6sy) will indeed be sensitive to the frequency of inverter oscillation.

When the inverter frequency is relatively close to the natural resonance frequency of the effective output inductance of winding 6s as interacting with capacitor 7, the output voltage will be relatively high—higher than the transformer open-circuit output voltage by a factor determined by the operating-Q of the loaded circuit. By virtue of the particular and highly non-linear current-voltage characteristics of the magnetron, the circuit operating-Q will be relatively high whenever the output voltage is relatively low (because dispropotionately little magnetron current will then flow); but the circuit operating-Q will be relatively low whenever the output voltage is relatively high (because disproportionately heavy magnetron current will then flow). Thus, the magnitude of the output voltage will in effect be determined by the voltage-magnitude required by the magnetron to cause significant flow of anode current; which implies that magnetron anode current will automatically tend to stay constant regardless of relatively small variations in the magnitude of the AC voltage supplied by the inverter. In other words, changes in the magnitude of the magnetron current that might be caused by variations in the magnitude of the power line input voltage will tend to be cancelled by virtue of the circuit Q-multiplying effect.

However, when the inverter frequency is substantially higher than said natural resonance frequency, the output voltage across winding 6s will be relatively low—so low as not to cause any significant magnetron anode current to flow. In other words, by increasing the inverter frequency significantly beyond circuit resonance, the power flow to the magnetron can be reduced to a negligible amount. Thus, magnetron power can be controlled by way of controlling the inverter oscillation frequency.

While both secondary winding 6s and tertiary winding 6t are relatively loosely coupled with primary winding 6p, the coupling between 6s and 6t is relatively tight; which implies that the voltage present across the output of 6t is proportional in amplitude to that present across the ouput of 6s. Thus, voltage limiting means 9 (which is connected directly across the output of winding 6t) acts to limit the amplitude of the voltage across the output of winding 6s, as well as across winding 6t.

The amplitude at which means 9 provides its voltage limiting effect is chosen such that the voltage across winding 6s will not significantly exceed the voltage level at which the magnetron will normally provide voltage limitation. Thus, during brief periods when the magnetron might not be operating in its normal voltage-limiting mode—such as during the very brief period required for its cathode to reach full operating temperature after initial power turn-on—voltage limiting means 9 will prevent the Q-multiplication effect from giving rise to destructively high output voltages across winding 6s.

The relatively high-frequency AC voltage output across winding 6s is applied to a conventional high-voltage rectifier and filter means 8, the output of which is a relatively constant DC voltage of magnitude suitable for providing the required magnetron anode voltage—typically on the order of 5000 Volt.

Due to the relatively high frequency of the AC voltage applied to rectifier and filter means 8, a high degree of filtering can be attained with a relatively modest size energy storing reactor. For instance, for a given amount of ripple on the output DC voltage, a filtering capacitor at 30 kHz would need to be only 1/500 of the capacitance it would have had to be at 60 Hz.

With most conventional inverter circuits, to prevent potentially self-destructive inverter operation, it is important to note that the inverter frequency should at no time be permitted to significantly lower than the natural resonance frequency of the transformer 6 output inductance as interacting with capacitor 7; which inductor-capacitor combination represents a series-tuned L-C circuit effectively connected directly across the inverter output.

On the other hand, to provide for the best possible high-frequency power factor—which implies optimum inverter efficiency and minimum inverter components stress—it is important, when powering the magnetron, to have said natural resonance frequency be relatively close to the inverter oscillating frequency.

Although the power supply herein disclosed would permit operating the magnetron at substantially any desired level of DC current input, thereby providing for any desired level of microwave oven cooking power, it is submitted that a better and more efficient method of regulating cooking power is that of turning the magnetron ON and OFF in duty-cycle fashion and in accordance with the amount of cooking power needed on an average basis. That way, the magnetron can be operated at its optimum point at all times—this optimum point being mainly determined on the basis of best energy conversion efficiency commensurate with a minimum of spurious radiation effects.

By well known techniques, this ON-OFF duty-cycle function can readily be attained by way of programming means 11 in cooperation with inverter control means 45. Depending on the particular requirements of the application at hand, this ON-OFF control may be achieved either in the fashion of varying the inversion frequency (with the help of saturable inductor 46), or by turning the inverter ON and OFF (which will result when inductor 46 is replaced wih a direct short circuit).

It is noted that there is no basic need to have a separate transformer means as an integral part of inverter 4—such as represented by auto-transformer 41. Rather, as would be well known in the art, transformer 41 could simply be combined with main power transformer 6 in the sense of being represented by its (now center-tapped) primary winding 6s.

Moreover, it is noted that there is no basic necessity for using a separate transformer for providing power for the indicated auxiliary loads. Rather, the output provided by transformer 5 can instead be provided by an additional output winding on transformer 6, which additional winding should be tightly coupled with primary winding 6p.

It is also noted that the inverter-based microwave oven power supply herein described may itself constitute a source of Electro-Magnetic Interference (EMI), particularly in terms of sending EMI out on the power line. However, it is relatively simple to prevent this form of EMI by way of including an EMI filter in circuit with the power line input. In fact, power-factor-correction means 2 would naturally constitute such a filter.

It is additionally noted that, in most anticipated applications, it would be advantageous for programmer 11 to have a built-in time-base; which would then be used in establishing the indicated ON-OFF duty-cycle for the magnetron.

It is also anticipated that programmer 11 constitute the basic cooking programmer for the microwave oven; in which case it is important that it be provided with a substantially non-interruptible source of power.

Such a source of power may be a built-in battery, (which battery could be rechargeably powered from terminals 1DCx and 1DCy of power supply 1), but it could also be a separate power supply fed directly from the power line.

It is yet also noted that the current-regulating characteristics of the subject power supply, in addition to its high-frequency power-factor-correction characteristics, is herein described as being attained by way of a series-resonant circuit effectively connected across the output of the inverter—with the magnetron being coupled in parallel circuit with one of the reactive elements of this series-resonant circuit. However, with other inverter configurations and/or with other high-voltage rectifier configurations, a parallel-resonant or a composite series/parallel-resonant circuit may be used. In any case, to attain the desired current-regulating benefits, it is desirable that the magnetron be connected such as to act in effect as a load that is parallel-connected to one of the reactive elements of the resonant circuit. That way, the circuit-Q would increase as the current supplied to the magnetron would decrease.

Next, it is noted that high voltage rectifier and filter means 8 is herein anticipated to constitute an ordinary high-voltage bridge rectifier with a high-voltage filter capacitor connected across its output. However, it is understood that several other rectifier-filter arrangements can be used.

One such other arrangement, which is well known in the art, involves the use after rectification of a pi-filter consisting of a relatively small-capacity shunt-capacitor followed by a series-inductor, which is then followed by another relatively large-capacity shunt-capacitor. This arrangement can at least in part accomplish the power-factor-correction which, in FIG. 1, is being accomplished with capacitor 7 in combination with the leakage inductance of transformer 6. In other words, at least some of the high-frequency power-factor-correction can be accomplished as part of the high-voltage rectifier and filter means 8.

Similarly, in FIG. 1, instead of using power factor correction means 2 for separately accomplishing the desired correction of power factor as asociated with the flow of power from the power line to power supply 1, a similar pi-filter may be incorporated with rectifier and filter means 3.

Finally, it is noted that "corrected power factor", "power factor correction means" or similar terms used in this patent application refer to the notion of a power factor that is substantially improved over-and-above what it would have been without overt use of power factor correction means.

For instance, the power factor normally associated with the power flowing from a conventional household power line and directly into an ordinary full-wave rectifier and filter means is typically about 50%. With even a high-efficiency microwave oven requiring a total power input of over 1000 Watt, the Volt-Amp product resulting with a 50% power factor is over 2000 VA; which is simply too high to be accommodated from an ordinary household power receptacle, which is typically fused at 15 Amp.

On the other hand, using power factor correction means as herein prescribed, the power factor associated with the power flowing into rectifier and filter means 3 can readily be made as high as 90%; although it would frequently be adequate if it were only about 70%.

Correspondingly, in respect to the power factor associated with the flow of high-frequency power from inverter 4 and to high-voltage rectifier and filter means 8, and in view of the need to provide for a high degree of magnetron current regulation, it is noted that—without the overt use of correction means—this power factor would be very low. Typically, without correction, it would be about 30%; which would imply that the Volt-Amp product required to be handled by the inverter would have to be three times as large as the power delivered. With correction as shown, this power factor is improved to 70% or so—with corresponding improvement in inverter efficiency and reduction in component ratings.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. In combination with a magnetron, an operating system comprising:
   a source means operative to provide an output of relatively low-magnitude unidirectional voltage,
   an inverter means operative to receive said output of relatively low-magnitude unidirectional voltage and to provide an output of relatively low-magnitude high-frequency AC voltage,
   a first transformer means operative to receive said output of relatively low-magnitude high-frequency AC voltage and to provide an output of relatively high-magnitude high-frequency AC voltage,
   a high-frequency rectifying means operative to receive said output of relatively high-magnitude high-frequency AC voltage and to provide an output of relatively high-magnitude unidirectional voltage of substantially constant magnitude, and
   means connecting said output of relatively high-magnitude unidirectional voltage to the magnetron for energization thereof.

2. The operating system of claim 1 wherein said source means additionally comprises a rectifier means and derives its power from an ordinary electric utility AC power line.

3. The operating system of claim 2 wherein said source means additionally comprises a power-factor-correcting means, thereby to improve the power factor characterizing the power drawn from said AC power line.

4. The operating system of claim 3 comprising a programming means operable programmably to actuate said inverter control means, thereby programmably to control the energization of the magnetron.

5. The operating system of claim 4 wherein said first transformer means comprises significant leakage inductance and where said electrically actuatable inverter control means is operable to control the frequency of said high-frequency AC voltage, thereby to affect the flow of power to the magnetron.

6. The operating system of claim 5 wherein a capacitor is connected in circuit with said leakage inductance, and wherein said capacitor is operative, at a first frequency within the range of control of said electrically actuatable inverter control means, to effect resonance or near-resonance between said leakage inductance and the capacitance of said capacitor, thereby to cause said relatively high-magnitude high-frequency AC voltage to become even larger in magnitude, thus increasing the flow of power to the magnetron.

7. The operating system of claim 6 wherein said capacitor is additionally operative, at a second frequency within the range of control of said electrically actuatable inverter control means, to cause said relatively high-magnitude high-frequency AC voltage to diminish in magnitude, thus limiting the flow of power to the magnetron.

8. The operating system of claim 7 wherein said electrically actuatable inverter control means is operative, whenever in its actuated state, to prevent the inverter from inverting, thereby correspondingly to stop the flow of power to the magnetron.

9. The operating system of claim 1 comprising a second transformer means, said second transformer means being operative to provide an auxiliary output of relatively low-magnitude high-frequency AC voltage for applications other than that of powering the magnetron.

10. The operating system of claim 9 wherein a voltage limiting means is connected in parallel circuit with said third output.

11. The operating system of claim 1 comprising current-regulating means operative to render the current provided to the magnetron, from said output of relatively high-magnitude unidirectional voltage, relatively non-variable in response to variations in the magnitude of said output of relatively low-magnitude unidirectional voltage.

12. The operating system of claim 11 comprising control means operable to control the magnitude of the relatively non-variable current provided to the magnetron.

13. The operating system of claim 12 comprising a programming means operable programmably to effect control of said control means, thereby programmably to effect control of the magnetron current.

14. The operating system of claim 1 comprising control means operable to control the flow of power to the magnetron.

15. In combination with a magnetron, a power supply adapted to be powered from a regular electric utility AC power line and comprising:

rectifier and filter means operable to connect with said power line and operative to convert the power line AC voltage to a first output, said first output being a relatively low-magnitude substantially constant DC voltage, inverter and transformer means operative to receive said first output and to convert said relatively low-magnitude substantially constant DC voltage to a second output, said second output being a relatively high-magnitude high-frequency AC voltage, and means connected with said magnetron and operative to receive said second output and to convert said relatively high-magnitude high-frequency AC voltage into a third output, said third output being a relatively high-magnitude DC voltage operable to provide a non-pulsating substantially constant unidirectional current for powering said magnetron.

16. The power supply of claim 15 wherein said inverter and transformer means comprises an inductance means operatively in series-connection with said second output.

17. The power supply of claim 16 wherein a capacitor is connected in circuit with said inductance means, said capacitor being operative materially to improve the power factor characterizing the high-frequency AC power flowing from said second output.

18. The power supply of claim 15 wherein said rectifier and filter means comprises a power factor correction means operative materially to improve the power factor characterizing the flow of power from said AC power line.

19. The power supply of claim 15 wherein said inverter and transformer means comprises an electrically actuatable inverter control means, said inverter control means being operable to control the magnitude and/or the frequency of the AC voltage provided at said second output, thereby providing for means to control the flow of power to the magnetron.

20. The power supply of claim 19 wherein said inverter and transformer means comprises an inductance means operatively connected in series with said second output.

21. The power supply of claim 20 wherein said inverter control means is operable to control the frequency of the AC voltage provided at said second output.

22. The power supply of claim 21 wherein a capacitor is connected in circuit with said second output, said capacitor having a capacitive reactance of an absolute magnitude that is substantially equal to or lower than that of the reactance of said inductance means.

23. The power supply of claim 19 comprising a programming means operable to control said electrically actuatable inverter control means, said programming means thereby being operable to control the flow of power to the magnetron in accordance with a program that has been programmed into it.

24. The power supply of claim 15 comprising means operative to provide an auxiliary output, said auxiliary output being a relatively low-magnitude high-frequency AC voltage operable for application to loads other than the magnetron.

25. The power supply of claim 24 wherein said auxiliary output is electrically isolated from said AC power line.

26. The power supply of claim 15 and means operable to regulate the magnitude of said non-pulsating substantially constant unidirectional current.

27. The power supply of claim 16 comprising a programming means operable programmably to control the magnitude of said non-pulsating substantially constant unidirectional current.

28. The power supply of claim 15 comprising means operable to provide a fourth output, said fourth output being a relatively low-magnitude high-frequency AC voltage operable to power the cathode of said magnetron.

29. The power supply of claim 15 wherein said inverter and transformer means comprises a self-oscillating inverter.

30. The power supply of claim 29 wherein said self-oscillating inverter comprises saturable transformer feedback means.

31. An operating system combined with a magnetron, said system comprising:
a source means operative to provide a first output of relatively low magnitude unidirectional voltage,
an inverter means operative to receive said first output and to provide a second output of relatively low-magnitude high-frequency AC voltage,
a first transformer means operative to receive said second output and to provide a third output of relatively high-magnitude high-frequency AC voltage, said transformer means comprising a primary winding adapted to receive said second output and a secondary winding adapted to provide said third output, there being substantial magnetic flux leakage between said primary winding and said secondary winding, said flux leakage being operatibe to provide a manifest limitation on the magnitude of the current that can flow from said third output,
a high-frequency rectifying means operative to receive said third output and to provide a fourth output of relatively high-magnitude unidirectional voltage, and
means connecting said fourth output to the magnetron for energization thereof.

32. An operating system combined with a magnetron, said system comprising:
a source means operative to provide a first output of relatively low-magnitude unidirectional voltage,
a self-oscillating inverter means operative to receive said first output and to provide a second output of relatively low-magnitude high-frequency AC voltage, said inverter means comprising an electrically actuatable inverter control means operable to directly control the inverter's mode of inversion, thereby to control said second output,
a first transformer means operative to receive said second output and to provide a third output of relatively high-magnitude high-frequency AC voltage,
a high-frequency rectifying means operative to receive said third output and to provide a fourth output of relatively high-magnitude unidirectional voltage, and
means connecting said fourth output to the magnetron for energization thereof.

33. An operating system combined with a magnetron, said system comprising:
a source means operative to provide a first output of relatively low-magnitude unidirectional voltage,
an inverter means operative to receive said first output and to provide a second output of relatively low-magnitude high-frequency AC voltage,
a transformer means operative to receive said second output and to provide a third output of relatively high-magnitude high-frequency AC voltage, said third output being characterized as having a substantially inductive internal impedance,
a capacitor means being connected in parallel circuit directly across said third output and operative to resonantly interact with said inductive internal impedance at the fundamental frequency of said AC voltage,
a high-frequency rectifying means operative to receive said third output and to provide a fourth output of relatively high-magnitude unidirectional voltage, and
means connecting said fourth output to the magnetron for energization thereof.

34. An operating system combined with a magnetron, said system comprising:
a source means operative to provide a first output of relatively low-magnitude substantially constant unidirectional voltage,
an inverter means operative to receive said first output and to provide a second output of relatively low-magnitude high-frequency AC voltage,
a transformer means operative to receive said second output and to provide a third output of relatively high-magnitude high-frequency AC voltage,
a high-frequency rectifying means operative to receive said third output and to provide a fourth output of relatively high-magnitude substantially ripple-free unidirectional voltage, and
means connecting said fourth output to the magnetron for energization thereof.

35. An operating system combined with a magnetron, said system comprising:
a source means operative to provide a first output of relatively low-magnitude unidirectional voltage,
an inverter means operative to receive said first output and to provide a second output of relatively low-magnitude high-frequency AC voltage,
a transformer means operative to receive said second output and to provide a third output of relatively high-magnitude high-frequency AC voltage, said third output being characterized by having a substantially inductive output impedance,
a capacitor means connected in parallel circuit directly across said third output, said capacitor means being operable to series-resonantly interact with said inductive output impedance at the fundamental frequency of said AC voltage, thereby causing the magnitude of said relatively high-magnitude high-frequency AC voltage to be substantially larger than it would have been without such series-resonance effect,
a high-frequency rectifying means connected in parallel-circuit with said capacitor means and operative to provide a fourth output of relatively high-magnitude unidirectional voltage, and
means connecting said fourth output to the magnetron for energization thereof.

36. The system of claim 35 wherein a voltage clamping means is connected in circuit with said third output, thereby providing a limitation on the maximum magnitude of the voltage that can develop across said capacitor means during such times when adequate circuit loading is not provided by said magnetron.

37. An operating system combined with a magnetron, said system comprising:

rectifier means connected with the relatively low frequency voltage of an ordinary electric utility power line and operative to provide an output of relatively low-magnitude unidirectional voltage;

inverter means operative to receive said output of relatively low-magnitude unidirectional voltage and to provide an output of relatively low-magnitude high-frequency AC voltage, said AC voltage being of a frequency substantially higher than that of the voltage on said power line;

transformer means operative to receive said output of relatively low-magnitude high-frequency AC voltage and to provide an output across a pair of output terminals of relatively high-magnitude high-frequency AC voltage, said transformer means comprising inductance means operative to make said output of relatively high-magnitude high-frequency AC voltage exhibit a predominantly inductive output impedance;

capacitor means connected across said pair of output terminals and operative to resonantly interact with said inductive output impedance, thereby forming a resonant circuit; and high-frequency rectifier and load means effectively connected in parallel circuit with said capacitor means and operative to provide a relatively high-magnitude DC voltage for energizing said magnetron;

whereby said resonant circuit is series-excited and parallel-loaded.

38. A power supply combined with a magnetron, comprising:

voltage transformation means connected with the relatively low-magnitude low-frequency voltage of an ordinary electric power line and operative to provide an output of relatively high-magnitude high-frequency voltage, the frequency of this high-frequency voltage being substantially higher than that of said low-frequency voltage;

rectifier and filter means connected with said output of high-magnitude high-frequency voltage and operative to provide an output of current-limited high-magnitude DC voltage, said DC voltage having substantially no voltage-ripple at frequencies equal to or higher than the frequency of said high-frequency voltage; and connect means connecting said output of high-magnitude DC voltage to said magnetron for the effective operation thereof.

* * * * *